United States Patent [19]

Konishi et al.

[11] Patent Number: 5,725,960
[45] Date of Patent: Mar. 10, 1998

[54] MOLDED ARTICLES HAVING HARD COAT LAYER AND METHOD FOR PRODUCING SAME

[75] Inventors: Yuichiro Konishi, Kawasaki; Tohru Hosaka, Yokohama; Mitsushi Tada, Sagamihara; Tadao Natsuume, Yokosuka; Nobukazu Takahashi, Yokohama; Teiji Kohara, Kawasaki, all of Japan

[73] Assignee: Nippon Zeon Co., Ltd., Tokyo, Japan

[21] Appl. No.: 448,557

[22] PCT Filed: Dec. 24, 1993

[86] PCT No.: PCT/JP93/01870

§ 371 Date: Jun. 7, 1995

§ 102(e) Date: Jun. 7, 1995

[87] PCT Pub. No.: WO94/14878

PCT Pub. Date: Jul. 7, 1994

[30] Foreign Application Priority Data

| Dec. 28, 1992 | [JP] | Japan | 4-361129 |
| Jun. 8, 1993 | [JP] | Japan | 5-164059 |
| Aug. 31, 1993 | [JP] | Japan | 5-238858 |
| Aug. 31, 1993 | [JP] | Japan | 5-238859 |

[51] Int. Cl.$^6$ ............ B32B 13/12; B32B 27/16; B32B 27/28; G02B 1/10

[52] U.S. Cl. .......... 428/451; 428/519; 428/522; 351/166

[58] Field of Search .......... 428/451, 517, 428/519, 522, 521, 426, 441; 351/166

[56] References Cited

U.S. PATENT DOCUMENTS

| 4,395,463 | 7/1983 | Kray | 428/447 |
| 5,221,560 | 6/1993 | Perkins et al. | 427/515 |
| 5,278,246 | 1/1994 | Shiraki et al. | 525/301 |
| 5,310,439 | 5/1994 | Matsui et al. | 156/307.3 |
| 5,366,812 | 11/1994 | Takahashi et al. | 428/523 |
| 5,437,926 | 8/1995 | Takahashi et al. | 428/337 |
| 5,468,803 | 11/1995 | Takahashi et al. | 524/553 |

FOREIGN PATENT DOCUMENTS

| 1-141924 | 6/1989 | Japan |
| 3-95235 | 4/1991 | Japan |
| 3-122137 | 5/1991 | Japan |

OTHER PUBLICATIONS

Encyclopedia or Polymer Science and Engineering, Sup. vol., pp. 674–689, 1985 ed.

*Primary Examiner*—Paul J. Thisodeau
*Assistant Examiner*—D. Lawrence Tarazano
*Attorney, Agent, or Firm*—Armstrong, Westerman, Hattori, McLeland & Naughton

[57] ABSTRACT

A molded article having an adhesion of at least 50 squares per 100 squares in crosscut adhesion test and at least 40 squares per 100 squares even after kept in a warm water of 70° C. for 1 hour, a haze value of 1.0% or less in Taber abrasion test and a pencil hardness of 2H or higher, said molded article being obtained by modifying the surface of a substrate formed of a thermoplastic norbornene resin to have a surface tension of 50 dynes/cm or greater by a treatment such as corona discharge treatment or the like or forming a preliminary primer layer of a modified product obtained by introducing a polar group into a copolymer of a vinyl aromatic compound and a conjugated diene, or the like; forming a primer layer for silicone hard coating agent on the modified surface or the preliminary primer layer, and then forming thereon a silicone hard coat layer, and a method for producing the molded article.

13 Claims, No Drawings

MOLDED ARTICLES HAVING HARD COAT LAYER AND METHOD FOR PRODUCING SAME

TECHNICAL FIELD

The present invention relates to a molded article the surface of which comprises a thermoplastic norbornene resin and has a hard coat layer excellent in adhesion thereto, a material for the molded article, a method for producing the molded article which comprises in combination a step of surface modification and a step of forming a primer layer, and a method for producing the molded article which includes a step of forming a multiple primer layer.

BACKGROUND ART

If lenses of spectacles and rear view mirrors for automobiles have a flaw on the surface, there are the problems that our eyes are adversely affected by irregular reflection, etc. and the images become inaccurate. Therefore, the surface hardness is increased by using a glass of high hardness or providing a hard coat layer on the surface of transparent resins. However, glass per se is heavy in weight and lacks flexibility.

On the other hand, hard coating agents used for transparent resins are roughly classified into silicone hard coating agents and organic hard coating agents. However, the organic hard coating agents are generally low in hardness and inferior in abrasion resistance and thus are insufficient in performances to be used for molded articles the surface of which readily flaws.

As for the silicone hard coating agents, when they are used on the molded articles having as its surface a thermoplastic norbornene resin which has recently been noticed as an optical material excellent in transparency, heat resistance and moisture resistance and low in birefringence, they are poor in wettability with the thermoplastic norbornene resin and insufficient in adhesion to the resin and as a result they suffer from the problem that the hard coat layer after cured peels off from the molded article. Moreover, thermoplastic norbornene resins having no polar group are high in chemical resistance and hence it is difficult to carry out surface treatment thereof and it is also difficult to sufficiently increase the adhesion only by chemical treatment. On the other hand, in the case of thermoplastic norbornene resins improved in adhesion by introducing a polar group, a hard coat layer having a certain adhesion can sometimes be formed, but the adhesion is practically not enough and furthermore, since the moisture resistance lowers due to the introduction of polar group, the layer readily peels off under severe conditions of high temperature and humidity. Moreover, since chemical resistance lowers, the surface dissolves to lose transparency when solvents used for general silicone hard coating agents are employed.

Accordingly, molded articles comprising thermoplastic norbornene resins and having a silicone hard coat layer excellent in adhesion to the surface of the molded articles have not yet been obtained.

DISCLOSURE OF INVENTION

As a result of intensive research on the adhesion between molded articles comprising a thermoplastic norbornene resin and a silicone hard coat layer, the inventors have found that a hard coat layer and the surface of molded articles can be allowed to firmly adhere to each other by carrying out modification of the surface of the molded articles and formation of a primer layer in combination or by carrying out formation of a multiple primer layer. Thus, the present invention has been accomplished.

According to the present invention, there are provided a molded article comprising a thermoplastic norbornene resin and having a silicone hard coat layer which has such adhesion to a substrate formed of the thermoplastic norbornene resin that the number of squares which are not peeled off when subjected to crosscut adhesion test is at least 50 squares per 100 squares (hereinafter referred to as "a crosscut adhesion of at least 50 squares per 100 squares"), a method for producing said molded article, characterized by comprising modifying the surface of a thermoplastic norbornene resin substrate so as to give a surface tension of 50 dynes/cm or more, forming a primer layer on the surface and then forming a silicone hard coat layer, a method for producing said molded article, characterized by forming a preliminary primer layer comprising a modification product obtained by introducing a polar group into a copolymer (hydrogenation product) of a vinyl aromatic compound and a conjugated diene or a modification product obtained by introducing a polar group into a propylene-ethylene copolymer on the surface of a thermoplastic norbornene resin substrate, forming a primer layer for a silicone hard coating agent on the preliminary primer layer and forming a silicone hard coat layer on the primer, and a molded article the surface of which comprises a thermoplastic norbornene resin and has a hard coat layer excellent in adhesion to the surface of the molded article and which is produced by the two methods mentioned above.

BEST MODE FOR CARRYING OUT THE INVENTION

(Substrate)

The substrate on which a hard coat layer is to be formed in the present invention means a molded article where at least the surface on which the hard coat layer is formed is a thermoplastic norbornene resin.

The thermoplastic norbornene resins used in the present invention are those which are known in Japanese Patent Kokai Nos.3-14882, 3-122137 and 4-63807, and examples thereof are ring-opening polymers of norbornene monomers and hydrogenation products thereof, addition polymers of norbornene monomers and addition copolymers of norbornene monomers and olefins and modification products of these polymers.

The norbornene monomers are monomers which are also known in the above-mentioned patent publications and Japanese Patent Kokai Nos.2-227424 and 2-276842 and as examples thereof, mention may be made of norbornene, its alkyl, alkylidene or aromatic substituted derivatives and these substituted or unsubstituted olefins substituted with a polar group, e.g., halogen, hydroxyl group, ester group, alkoxy group, cyano group, amide group, imide group, silyl group, etc., such as 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, etc.; oligomers formed by radical addition of cyclopentadiene per se and their derivatives or substitution products as mentioned above, such as dicyclopentadiene, 2,3-dihydrodicyclopentadiene, 1,4:5,8-dimethano-1,2,3,4,4a,5,8,8a-2,3-cyclopentadienonaphthalene, 6-ethyl-1,4:5,8- dimethano-1,4,4a,5,6,7,8,8a-octahydronaphthalene, 1,4:5,
10:6,9-trimethano-1,2,3,4,4a,5,5a,6,9,9a,10,10a-
dodecahydro-2,3-cyclopentadienoanthracene, etc.; addition
products of cyclopentadiene with tetrahydroindene, etc. and
their derivatives or substitution products as mentioned
above, such as 1,4-methano-1,4,4a,4b,5,8,8a,9a-
octahydrofluorene, 5,8-methano-1,2,3,4,4a,5,8,8a-
octahydro-2,3-cyclopentadienonaphthalene, etc.; etc.

Polymerization of the norbornene monomers can be carried out by known processes and if necessary, the monomers can be copolymerized with other copolymerizable monomers or can be hydrogenated to produce hydrogenated thermoplastic norbornene polymers which are thermoplastic saturated norbornene resins. Furthermore, the polymers or hydrogenated polymers may be modified with α,β-unsaturated carboxylic acids and/or derivatives thereof, styrenic hydrocarbons, organic silicone compounds having an olefinic unsaturated bond and hydrolyzable group or unsaturated epoxy monomers by the processes known, for example, in Japanese Patent Kokai No.3-95235. Thermoplastic norbornene resins having no polar group are excellent in moisture resistance and chemical resistance. Furthermore, thermoplastic norbornene resins having no polar group improve adhesion between the silicone hard coat layer and the substrate and are preferred.

Molecular weight is suitably 10,000–200,000 in terms of number-average molecular weight measured by GPC (gel permeation chromatography) analysis using cyclohexane as a solvent. When hydrogenation is carried out, degree of the hydrogenation is 90% or higher, preferably 95% or higher, more preferably 99% or higher for improving resistance to photo-deterioration and resistance to weathering deterioration.

The thermoplastic saturated norbornene resins used in the present invention may contain various additives, e.g., aging inhibitors such as those of phenolic type and phosphorus type; heat deterioration inhibitors such as those of phenolic type; ultraviolet absorbers such as those of benzophenone type; antistatic agents such as those of amine type; lubricants such as esters of aliphatic alcohols and partial esters and partial ethers of polyhydric alcohols; etc. Moreover, other resins may be added to the resins as far as attainment of the object of the present invention is not hindered.

The method for molding the molded articles used in the present invention is not especially limited. There may be used general methods employed for molding thermoplastic resins such as injection molding, melt extrusion, hot pressing, solvent casting and drawing. It suffices that the surface on which the hard coat layer is to be formed comprises the thermoplastic norbornene resin, and other part may comprise other resins than the norbornene resin or resins integrally molded with inserting a metal.

(Surface Modification Treatment)

Untreated thermoplastic norbornene resins have a surface tension of usually about 25–40 dynes/cm. In one of the methods of the present invention, the surface of molded article comprising the thermoplastic norbornene resin on which the hard coat layer is to be formed is modified so that it has a surface tension of 50 dynes/cm or more, preferably 60 dynes/cm or more, more preferably 70 dynes/cm or more. The surface modification treatment is not especially limited and examples are irradiation with energy beam and chemical treatment.

The irradiation with energy beam includes corona discharge treatment, plasma treatment, irradiation with electron beam, irradiation with ultraviolet ray, etc. From the point of efficiency of treatment, corona discharge treatment and plasma treatment are preferred and corona discharge treatment is especially preferred. Conditions for irradiation with energy beam are not especially limited as far as the desired surface modification can be attained and known methods can be employed. For example, in the case of corona discharge treatment, the known conditions as described in Japanese Patent Kokoku No.58-5314 and Japanese Patent Kokai No.60-146078 can be employed. In the case of plasma treatment, the known conditions as described in Japanese Patent Kokoku No.53-794 and Japanese Patent Kokai No.57-177032 can be employed.

The chemical treatment can be carried out by immersing the molded article in an aqueous solution of an oxidizing agent such as potassium bichromate, or a concentrated sulfuric acid and then sufficiently washing it with water. Shaking at the immersed state is effective, but long-term treatment results in the problems such as dissolution of the surface and decrease of transparency. Especially, in the case of using thermoplastic norbornene resins having polar group, it is necessary to adjust treating time, etc. depending on the reactivity and concentration of chemicals used.

(Formation of Preliminary Primer Layer)

In another one of the methods of the present invention, in place of the surface modification treatment or after the surface modification treatment, a preliminary primer layer is formed on the surface of the substrate on which the hard coat layer is formed.

The preliminary primer used for forming the preliminary primer layer comprises a modification product obtained by introducing a polar group into a copolymer (hydrogenation product) of a vinyl aromatic compound and a conjugated diene or a modification product obtained by introducing a polar group into a propylene-ethylene copolymer.

The copolymer (hydrogenation product) of vinyl aromatic compound and conjugated diene which is a base polymer of the preliminary primer used in the present invention is excellent in adhesion to thermoplastic norbornene resins. From the point of good adhesion, the copolymer contains preferably 10–80% by weight, more preferably 20–70% by weight and especially preferably 25–60% by weight of recurring structural unit originating from the vinyl aromatic compound, and from the viewpoint of good workability, etc., it has a melt index (200° C., 5 kg) of preferably 0.1–60 g/10 min, more preferably 0.3–40 g/10 min. In order to avoid discoloration caused by long-term using, the copolymer is preferably such that the double bond in recurring unit originating from the conjugated diene is hydrogenated, and degree of the hydrogenation is preferably 70% or higher, more preferably 80% or higher.

As the vinyl aromatic compounds, mention may be made of styrene, o-vinyltoluene, m-vinyltoluene, p-vinyltoluene, vinylxylene, ethylstyrene, isopropylstyrene, ethylvinyltoluene, tert-butylstyrene, diethylstyrene, etc. Styrene is especially preferred.

As the conjugated dienes, mention may be made of 1,3-butadiene, isoprene, 1,3-pentadiene, 2,3-dimethylbutadiene, etc. 1,3-Butadiene and isoprene are especially preferred.

Examples of the copolymers (hydrogenation products) of vinyl aromatic compounds and conjugated dienes are styrene-butadiene-styrene block copolymers, styrene-isoprene-styrene block copolymers, styrene-ethylene-butadiene-styrene block copolymers, styrene-butadiene random copolymers, styrene-isoprene random copolymers, etc. and hydrogenation products thereof. They may be either of straight chain structure or branched chain structure. They may be random copolymers (hydrogenation products), but from the point of adhesion to thermoplastic norbornene resins, they are preferably block copolymers (hydrogenation products). The block copolymers may contain a taper portion or partially random copolymer portion.

The propylene-ethylene copolymer which is a base polymer of another preliminary primer used in the present invention is also excellent in adhesion to thermoplastic norbornene resins. From the viewpoints of workability and adhesion to thermoplastic norbornene resins, the copolymer contains preferably 50–75 mol %, more preferably 60–70 mol % of recurring structural unit originating from propylene and has an intrinsic viscosity [η] measured in decalin at 135° C. of preferably 0.2–30 dl/g, more preferably 0.3–20 dl/g and a crystallinity measured by X-ray diffractometry of preferably 2–20%, more preferably 5–18%.

In the present invention, the base polymer into which a polar group is introduced is used as a preliminary primer layer. The polar group introduced is preferably —COOH or a derivative thereof. Examples are those which are modified with unsaturated carboxylic acids such as acrylic acid, methacrylic acid, maleic acid, fumaric acid, tetrahydrophthalic acid, itaconic acid, citraconic acid, crotonic acid, isocrotonic acid, nadic acid, etc.; derivatives of unsaturated carboxylic acids, e.g., halides, amides, imides, anhydrides, esters, etc., such as maleic chloride, maleimide, maleic anhydride, citraconic anhydride, monomethyl maleate, dimethyl maleate, glycidyl maleate, etc. Modification products with unsaturated carboxylic acids or anhydrides thereof are preferred since they are excellent in adhesion. More preferred are those which are modified with acrylic acid, methacrylic acid, nadic acid, nadic anhydride, maleic acid or maleic anhydride. Especially preferred are those which are modified with maleic acid or maleic anhydride. The polymers may be modified with a mixture of two or more of the unsaturated carboxylic acids.

The method for introducing polar group into copolymers (hydrogenation product) of vinyl aromatic compound and conjugated diene is not especially limited, but it is preferred to subject the copolymers to graft addition with compounds having polar group since this can sufficiently modify the hydrogenation products of copolymers of vinyl aromatic compound and conjugated diene. The method of graft addition is not especially limited and it can be carried out by known methods. For example, it can be performed by subjecting the copolymer and the compound to thermal reaction in a melt kneader or a solvent with addition of a radical generator. When radical generator is used, unreacted monomers sometimes remain in a large amount and the unreacted monomers are preferably removed by vacuum drying, etc. The addition amount of the monomers is 1–15 parts by weight, preferably 2–10 parts by weight for 100 parts by weight of the base polymer.

The preliminary primer may contain silane coupling agents such as vinyltrimethoxysilane, γ-glycidoxypropyltrimethoxysilane, γ-methacryloxypropyltrimethoxysilane, γ-aminopropyltrimethoxysilane, etc.; fillers such as carbon, glass fibers, glass beads, etc.; ultraviolet absorbers such as those of benzophenone type, benzotriazone type, etc.

The method of forming the preliminary primer layer is not especially limited. For example, a primer solution is coated on the surface of a substrate by brushing, dipping, spray coating, spin coating, roll coating, etc. and the solvent is volatilized. If the solvent remains in the primer layer, when the final products made using the molded articles of the present invention are used at high temperatures, there may occur the problems such as blister or blowing. Thus, it is preferred to sufficiently volatilize the solvent so that substantially no solvent remains. Usually, the coat is dried at 20°–120° C. for about 3 minutes to 1 hour.

The solvent is not especially limited as far as the solvent does not dissolve the surface of the substrate to deform or deteriorate it, but a poor solvent for thermoplastic norbornene resins which does not substantially corrode the surface of the substrate is used. Examples of such solvent are ketone solvents such as methyl ethyl ketone, methyl isobutyl ketone and diisobutyl ketone; ester solvents such as butyl acetate, propyl acetate and ethyl acetate; etc. These are used each alone or in admixture. Furthermore, for example, toluene and xylene are good solvents for thermoplastic norbornene resins, but when they are diluted to less than 70% by weight with a poor solvent such as methyl isobutyl ketone, they sometimes do not substantially corrode the thermoplastic norbornene resins when coated thereon. Such diluted solutions can be used as solvents for the preliminary primer solution.

Concentration of the primer solution is usually 1–20% by weight, preferably 2–15% by weight. If the concentration is too high, viscosity increases and if it is too low, it becomes difficult to coat the solution at a given thickness, and thus both cases cause deterioration in workability.

Coating amount is such that thickness of the primer layer from which the solvent has been removed is 1–20 μm, preferably 2–15 μm.

The molded article obtained by forming the preliminary primer layer on the surface of the thermoplastic norbornene resin substrate of the present invention is not only excellent in adhesion to a silicone hard coat layer when a primer layer for silicone hard coating agent is formed on the said molded article and then the silicone hard coat layer is further formed thereon, but also excellent in adhesion to other hard coat layer, an adhesive layer, a vapor-deposited metal compound film layer or the like which is formed on the said preliminary primer layer.

(Formation of Primer Layer for Silicone Hard Coating Agent)

In the present invention, after the surface of the molded article comprising thermoplastic norbornene resin is subjected to the surface modification treatment or after the preliminary primer layer is formed, a primer layer for silicone hard coating agent is additionally formed.

The primers for silicone hard coating agent used in the present invention are not especially limited as far as they are those which are generally used as primers for silicone hard coating agent on polycarbonates or polymethyl methacrylates. As such primers, generally used are thermoplastic acrylic resins (Japanese Patent Kokai No.52-138565 and Japanese Patent Kokoku Nos.61-27184 and 61-27185). Furthermore, there may be used acrylic resins into which amino group, hydroxy group, carboxyl group or amide group is introduced to improve durability (Japanese Patent Kokai Nos.53-138476 and 57-137154 and Japanese Patent Kokoku No.61-27183), acrylic resins containing silicon atom for improving adhesion (Japanese Patent Kokai No.1-149879) and reaction products of acrylic resins containing epoxy group with ultraviolet absorbers. In addition to the acrylic resins, epoxy resins, urethane resins, chlorinated polyolefins, etc. are also used and there may be used reaction products of epoxysilanes with aminosilanes and adducts of epoxysilanes with aminosilanes which are converted to amides (Japanese Patent Kokai Nos.56-16573 and 1-149879).

In general, the primer for silicone hard coating agent is used as a solution prepared by dissolving it in a solvent at a concentration of about 1–20% by weight. Examples of the solvent are alcoholic solvents such as methanol, ethanol and diacetone alcohol; cellosolve solvents such as methyl cellosolve and ethyl cellosolve; glycol solvents such as butanediol and hexanediol; aromatic solvents such as toluene and xylene; ester solvents such as ethyl acetate and butyl acetate; chloric solvents such as chloroform and methyl chloride. These may be used each alone or in admixture.

In case the preliminary primer layer is not formed, solvents which do not substantially corrode the surface of the substrate must be selected like the solvents used, in the formation of preliminary primer layer. Furthermore, in case the preliminary primer layer is formed, it is also necessary to select solvents which do not substantially corrode the preliminary primer layer. Therefore, it is recommended to determine the solvent used by previously examining whether corrosion occurs or not.

As solution of primer for silicone hard coating agent, there may also be used commercially available PC-7A (manufactured by Shin-Etsu Chemical Co., Ltd.), PH91 (manufactured by Toshiba Silicone Co., Ltd.), PH93 (manufactured by Toshiba Silicone Co., Ltd.), etc.

The method of using the solution of primer for silicone hard coating agent is the same as in the case of using silicone hard coating agents for polycarbonates and polymethyl methacrylates. For example, the solution of primer for silicone hard coating agents is coated by roll coating, brushing, spray coating, dipping, etc. and the coat is dried at 20°–60° C. for about 10 minutes to 2 hours. Usually, thickness of the primer layer for silicone hard coating agents after dried is about 1–20 µm, preferably 2–15 µm.

(Silicone Hard Coating Agent)

In the present invention, a silicone hard coat layer is formed using silicone hard coating agent after the surface modification treatment and the formation of the primer layer for silicone hard coating agent.

The silicone hard coating agents used in the present invention are those which are known as silicone paints or coating compositions in Japanese Patent Kokoku Nos.52-39691 and 54-28429, Japanese Patent Kokai No.55-94971, and Japanese Patent Kokoku Nos.62-5554, 62-9265 and 63-9538. The hard coating agents are compositions mainly composed of a hydrolyzate of silicone compound having a functional group and a polysiloxane which is a partial condensate of said hydrolyzate and containing additionally a colloidal silica prepared by dispersing silica fine particles having a particle size of 1–100 µm in water or an alcoholic solvent such as methanol, ethanol, isobutanol or diacetone alcohol and if necessary, further containing additives such as curing catalyst, solvent, silane coupling agent, curing accelerator, leveling agent, slip improver, wetting improver, smoothing agent, tackifier and colorant.

The silicone compound having a functional group used in the present invention is represented by the following formula (1) or (2).

$$R^1{}_m Si(OR^2)_{4-m} \quad (1)$$

$$R^1{}_m Si(OCOR^2)_{4-m} \quad (2)$$

$R^1$ in the formulas (1) and (2) represents a hydrocarbon group of 1–8 carbon atoms, a halogenated hydrocarbon group of 1–8 carbon atoms or an organic group containing amino group, mercapto group, epoxy group, acryl group, methacryl group or the like. $R^2$ in the formulas (1) and (2) represents a hydrocarbon group of 1–6 carbon atoms, and m in the formulas (1) and (2) is 0, 1 or 2.

As the silicone compounds having a functional group used for the silicone hard coating agents, mention may be made of, for example, methyltrimethoxysilane, methyltriethoxysilane, methyltributoxysilane, methyltris(2-methoxyethoxy)silane, ethyltrimethoxysilane, ethyltriethoxysilane, phenyltrimethoxysilane, phenyltriethoxysilane, dimethyldimethoxysilane, dimethyldiethoxysilane, diphenyldimethoxysilane, diphenyldiethoxysilane, tetramethoxysilane, tetraethoxysilane, tetrabutoxysilane, and glycidoxymethyltrimethoxysilane.

As the solvents for the silicone hard coating agents, there may be used, for example, alcoholic solvents used for dispersing the silica fine particles mentioned above; cellosolve solvents such as methyl cellosolve and ethyl cellosolve; alkylcarboxylic acid solvents such as formic acid and acetic acid; aromatic solvents such as toluene and xylene; ester solvents such as ethyl acetate and butyl acetate; etc. These may be used each alone or in admixture. However, for optical uses, solvents which do not dissolve the primer for silicone hard coating agents used are selected since uniformity is lost if the solvents for silicone hard coating agents corrode the primer layer for the silicone hard coating agents.

Although siloxanes can be cured without curing catalysts, it is preferred to add curing catalysts in order that the siloxanes can be cured even at relatively low temperatures or curing efficiency can be enhanced by increasing the curing rate. As the curing catalysts, mention may be made of, for example, alkali metal salts of organic acids such as sodium acetate and potassium formate; amine carboxylates such as dimethylamine acetate, ethanolamine acetate and dimethylanilyl formate; quaternary ammonium salts such as tetramethylammonium acetate and benzyltrimethylammonium acetate; metal salts of carboxylic acids such as tin octanoate; amines such as triethylamine, triethanolamine and pyridine; sodium hydroxide, ammonium hydroxide, etc. Especially, quaternary ammonium salts and alkali metal salts of organic acids are preferred for curing the siloxanes at low temperatures. Amount of the catalyst is not limited, but generally is about 0.01–0.1% by weight based on the hard coating agent.

Examples of the leveling agents are polyether-modified silicone compounds and fluorine-based leveling agents.

The coating method is not especially limited and, for example, spray coating, spin coating, roll coater and dipping can be employed. When a solvent is used, the coat is sufficiently dried after coating so that substantially no solvent is contained therein. The drying method is not especially limited.

Thickness of the hard coat layer at this drying state is about 1–30 µm, preferably 3–10 µm. The thickness of the hard coat layer does not substantially change even after subjected to the following curing treatment.

(Curing Method)

In the present invention, the method of curing the layer of silicone hard coating agent is not specially limited. In general, the layer is cured by heating at 80°–140° C., preferably 100°–120° C. for 1–2 hours.

(Molded Article having the Hard Coat Layer)

The molded article having the hard coat layer of the present invention is excellent in adhesion between the hard coat layer and the substrate, and when the molded article is subjected to crosscut adhesion test ("Terminology Dictionary of Practical Painting and Paint", page 106, edited by Editorial Committee for "Terminology Dictionary of Practical Painting and Paint" and published from Japan Painting Technique Association on Dec. 10, 1983), 50 squares or more, preferably 70 squares or more, more preferably 90 squares or more per 100 squares do not peel off. Furthermore, the molded article is excellent in heat resistance and, for example, when it is kept in a warm water of 70° C. for 1 hour, 40 squares or more, preferably 60 squares or more, more preferably 80 squares or more per 100 squares do not peel off according to the cross-hatch peeling test. Moreover, the molded article has a haze value of 1.0% or less after subjected to Taber abrasion test (ASTMD 1044-73). Furthermore, the molded article has a pencil hardness of 2H or higher, preferably 3H or higher.

When the primer layer for silicone hard coating agent is formed according to the present invention on the molded article comprising the thermoplastic norbornene resin having a polar group without carrying out the surface modification treatment, a molded article having the silicone hard coat layer can be obtained, but adhesion is insufficient. In the case of thermoplastic norbornene resin containing no polar group, the molded article having silicone hard coat layer sufficient in adhesion can be obtained for the first time by the method of the present invention and in this sense, the effect of the present invention is great when norbornene resins having no polar group are used.

Among the molded articles having the hard coat layer of the present invention, in the case of those which are produced using dyeable silicone hard coating agents such as the silicone hard coating agents disclosed, for example, in Japanese Patent Kokoku No.60-11727 and Japanese Patent Kokai Nos.61-166861, 2-163178 and 2-261826, the hard coat layer can be dyed with so-called disperse dyes.

The silicone hard coating agents mainly composed of a hydrolyzate of the silicone compound having a functional group represented by the above-mentioned formula (1) or (2) and a polysiloxane which is a partial condensate of said hydrolyzate are dyeable silicone hard coating agents.

The disperse dyes are not especially limited and can be known ones as far as they can dye the hard coat layer prepared using the dyeable silicone hard coating agent. As examples of the dyes, mention may be made of commercially available Brown-D (manufactured by Seiko Co., Ltd.), Sapphire Blue-4G (manufactured by Ciba-Geigy Corp.), ML Blue VF (manufactured by Mitsui Toatsu Dyestuff Co., Ltd.), ML Red VF-2 (manufactured by Mitsui Toatsu Dyestuff Co., Ltd.), ML Gold Yellow VF (manufactured by Mitsui Toatsu Dyestuff Co., Ltd.), ML Yellow VF-2 (manufactured by Mitsui Toatsu Dyestuff Co., Ltd.), and Brown AF (manufactured by Nippon Kayaku Co., Ltd.).

The method of dyeing is also not limited as far as the layer can be dyed. Generally, 0.1–2 parts by weight, preferably 0.2–1 part by weight of the disperse dye is dispersed and dissolved in 100 parts by weight of water and the molded article having the hard coat layer of the present invention is dipped in the resulting dyeing solution kept at 60°–100° C., preferably 70°–95° C. for 2–30 minutes, preferably 5–15 minutes. Thereafter, the article is sufficiently washed with water to remove the dyeing solution as a post-treatment. When the dyeing is carried out in the present invention, generally the dyeing treatment has substantially no influence on the adhesion between the hard coat layer and the substrate and normally the adhesion is not deteriorated.

(Use)

The molded articles having the hard coat layer of the present invention can be used as substitutes for glass such as window glass and glass door and furthermore, as substitutes for glass in the field where surface hardness and light weight are required, for example, spectacles such as general spectacles and colored sunglasses; automobile parts such as rear view mirror, fender mirror, sun roof and canopy; etc.

EXAMPLES

The present invention will be specifically explained by the following reference examples, examples and comparative examples. The light transmittance is a transmittance of light of 400 nm measured by an ultraviolet spectrophotometer. The surface tension was measured using a wetting index standard solution. The adhesion was determined by crosscut adhesion test. The haze value was measured by ASTMD 1003-61. The crosscut adhesion test, hot water treatment and abrasion test were conducted by the following methods.

(Crosscut Adhesion Test)

The hard coat layer formed on the surface of a molded article was cut with a cutter making eleven cuts at intervals of 1 mm in one direction and then these cuts were crosscut with eleven cuts at intervals of 1 mm which are perpendicular to the original cuts, thereby to make 100 squares of 1×1 mm. Then, a cellophane pressure sensitive tape (manufactured by Sekisui Chemical Co., Ltd.) was applied to the coat layer. The tape was then peeled by a force applied perpendicular to the surface of the molded article. The result is shown by the number of the squares remaining on the surface of the molded articles per 100 squares.

(Hot Water Treatment)

The molded article was put in a hot water kept at 70° C. for 1 hour and then taken out. Then, water was completely wiped off and the molded article was left to stand until the temperature reached room temperature.

(Taber Abrasion Test)

The test was conducted in accordance with ASTMD 1044-73 using a truck wheel CS-10 under a load of 500 g and at a number of revolutions of 100.

Reference Example 1

A thermoplastic saturated norbornene resin (ZEONEX 280 manufactured by Nippon Zeon Co., Ltd.; glass transition temperature: about 140° C.; number-average molecular weight: about 28,000; hydrogenation product of ring-opening polymer; degree of hydrogenation: at least 99.7%) was injection molded at a mold temperature of 100° C. and a resin temperature of 290° C. to obtain a plate of 3.0 mm×90 mm×55 mm.

This plate had a surface tension of 32 dynes/cm.

Example 1

The test piece obtained in Reference Example 1 was subjected to corona discharge treatment for 3 seconds using a high-frequency generator (Corona Generator HV05-2 manufactured by Tamtec Co., Ltd.) at an output voltage of 100% and an output of 250 W with a wire electrode of 1.2 mm in diameter and an electrode length of 240 mm at a distance of 1.5 mm from working electrode and thus the surface was modified to have a surface tension of 72 dynes/cm.

The surface-modified test piece was dipped in a primer solution for silicone hard coating agent (PH91: a solution of acrylic resin and diacetone alcohol in ethylene glycol monoethyl ether, manufactured by Toshiba Silicone Co., Ltd.), then taken out therefrom and dried at 40° C. for 10 minutes to remove the solvent, thereby to form a primer layer for silicone hard coating agent. No corrosion of the test piece with the solvent was seen and the primer layer had a thickness of about 5 μm.

The test piece on which the primer layer for silicone hard coating agent was formed was dipped in a silicone hard coating agent solution Tosguard 510 (a solution of polyalkylsiloxane having $C_1$–$C_{20}$ alkyl in ethanol, isobutyl alcohol, ethylene glycol monoethyl ether acetate and water, manufactured by Toshiba Silicone Co., Ltd.), taken out therefrom and kept at 110° C. for 2 hours to cure the coat, thereby to form a hard coat layer. No corrosion of the primer layer with the solvents was seen and the hard coat layer had a thickness of about 5 μm.

The light transmittance of the test piece having hard coat was 91.4%. The adhesion between the substrate and the hard coat layer was 100 squares per 100 squares and did not change, namely, 100 squares per 100 squares even after subjected to hot water treatment. The haze value after subjected to Taber abrasion test was 0.8%.

Example 2

A hard coat layer was formed on the test piece in the same manner as in Example 1 except that PC-7A (manufactured by Shin-Etsu Chemical Co., Ltd.) was used as the primer solution for silicone hard coating agent and KP-85 (manufactured by Shin-Etsu Chemical Co., Ltd.) was used as the silicone hard coating agent solution. No corrosion was seen in both the substrate and the primer layer, and both the primer layer and the hard coat layer had a thickness of about 5 μm.

The light transmittance of the test piece having hard coat was 91.4%. The adhesion between the substrate and the hard coat layer was 100 squares per 100 squares and did not change, namely, 100 squares per 100 squares even after subjected to hot water treatment. The haze value after subjected to Taber abrasion test was 0.8%.

Example 3

A hard coat layer was formed on the test piece in the same manner as in Example 1 except that PC-7A (manufactured by Shin-Etsu Chemical Co., Ltd.) was used as the primer solution for silicone hard coating agent and KP-64 (manufactured by Shin-Etsu Chemical Co., Ltd.) was used as the silicone hard coating agent solution. No corrosion was seen in both the substrate and the primer layer, and both the primer layer and the hard coat layer had a thickness of about 5 μm.

The light transmittance of the test piece having hard coat was 91.4%. The adhesion between the substrate and the hard coat layer was 100 squares per 100 squares and did not change, namely, 100 squares per 100 squares even after subjected to hot water treatment. The haze value after subjected to Taber abrasion test was 1%.

Example 4

Two parts by weight of a hydrogenation product of maleic anhydride-modified styrene-ethylene-butadiene-styrene block copolymer (Taftec M1913 manufactured by Asahi Kasei Kogyo K.K., having a melt index of 4.0 g/10 min at 200° C. and under 5 kg, a styrene block content of 30% by weight, a degree of hydrogenation of 80% or higher and an addition amount of maleic anhydride of 2%) was dissolved in a mixed solvent comprising 8 parts by weight of xylene and 40 parts by weight of methyl isobutyl ketone and the solution was filtered with a Teflon filter having a pore diameter of 1 μm to prepare only a complete solution as a preliminary primer solution.

The test piece obtained in Reference Example 1 was dipped in the preliminary primer solution, then taken out therefrom and dried at 100° C. for 10 minutes to form a preliminary primer layer. No corrosion of the substrate was seen and the preliminary primer layer had a thickness of about 4 μ/m.

This test piece was dipped in a primer solution PC-7A for silicone hard coating agent, then taken out therefrom and dried at 40° C. for 10 minutes to form a primer layer for silicone hard coating agent. No corrosion of the preliminary primer layer was seen and the primer layer for silicone hard coating agent had a thickness of about 4 μm.

The test piece on which the primer layer for silicone hard coating agent was formed was dipped in a silicone hard coating agent solution KP-64 (manufactured by Shin-Etsu Chemical Co., Ltd.), then taken out therefrom, kept at 110° C. for 2 hours to cure the coat, thereby to form a hard coat layer. No corrosion of the primer layer for silicone hard coating agent was seen and the hard coat layer had a thickness of about 5 μm.

The light transmittance of the test piece having hard coat was 91.4%. The adhesion between the substrate and the hard coat layer was 100 squares per 100 squares and did not change, namely, 100 squares per 100 squares even after subjected to hot water treatment. The haze value after subjected to Taber abrasion test was 0.8%.

Example 5

The test piece obtained in Example 3 was dipped for 10 minutes in a dyeing solution prepared by dissolving 0.5 part by weight of a disperse dye Karoyan-Polyester Brown AF (manufactured by Nippon Kayaku Co., Ltd.) in 100 parts by weight of water and kept at 90° C. to dye the test piece. The dyed test piece was washed with pure water to remove the dyeing solution.

The light transmittance of the dyed test piece was 64.5%. The adhesion between the substrate and the hard coat layer was 100 squares per 100 squares and did not change, namely, 100 squares per 100 squares even after subjected to hot water treatment. The haze value after subjected to the abrasion test was 1%. The change of total light transmittance of the test piece before and after subjected to dyeing which was measured using SM color computer (manufactured by Suga Tester Co., Ltd.) was 41.2%.

Comparative Example 1

A hard coat layer was formed on the test piece in the same manner as in Example 1 except that the primer layer for silicone hard coating agent was not formed.

The light transmittance of the test piece having hard coat was 91.2%. The adhesion between the substrate and the hard coat layer was 20 squares per 100 squares and was 0 square per 100 squares after subjected to the hot water treatment, namely, the coat had no adhesion. The coat layer completely peeled off after subjected to the abrasion test.

Comparative Example 2

A hard coat layer was formed on the test piece in the same manner as in Example 1 except that the corona discharge treatment was not effected.

The light transmittance of the test piece having hard coat was 91.4%. The adhesion between the substrate and the hard coat layer was 0 square per 100 squares and the coat had no adhesion. The coat layer completely peeled off after subjected to the abrasion test.

According to the present invention, thermoplastic norbornene resin molded articles which have a silicone hard coat layer difficult to peel off and excellent in abrasion resistance and which are usable as lenses of spectacles, automobile room mirrors, etc. are obtained.

We claim:

1. A molded article comprising a substrate formed of a thermoplastic norbornene resin having no polar groups, in which the surface of said substrate has been modified to produce a modified surface layer having a surface tension of at least 50 dynes/cm; a primer layer formed on the modified surface layer; and a silicone hard coat layer formed on said primer layer as a top coat layer.

2. A molded article according to claim 1, wherein the thermoplastic norbornene resin is at least one member selected from the group consisting of ring-opened polymers of norbornene monomers and hydrogenation products thereof, addition polymers of norbornene monomers, addition copolymers of norbornene monomers and olefins, and hydrogenation products of the addition polymers and copolymers.

3. A molded article according to claim 1, wherein the thermoplastic norbornene resin has a number-average molecular weight of 10.000–200.00.

4. A molded article according to claim 1, wherein the silicon hard coat layer is a hydrolyzate of a silicone compound of the formula $R^1_m Si(OR^2)_{4-m}$ or $R^1_m Si(OCOR^2)_{4-m}$, wherein $R^1$ is a hydrocarbon group of 1–8 carbon atoms, a halogenated hydrocarbon group of 1–8 carbon atoms or an organic group having thereon an amino group, mercapto group, epoxy group or (meth)acrylic group; $R^2$ is a hydrocarbon group of 1–6 carbon atoms, and m is 0, 1 or 2; or a partial condensate of said hydrolyzate.

5. A molded article according to claim 4, wherein the silicone compound is at least one member selected from the group consisting of methyltrimethoxysilane, methyltriethoxysilane, methyltributoxysilane, methyltris(2-methoxyethoxy)silane, ethyltrimethoxisilane, ethyltriethoxysilane, phenyltrimethoxysilane, phenyltriethoxisilane, dimethyldimethoxysilane, dimethyldiethoxysilane, diphenyldimethoxysilane, diphenyldiethoxysilane, tetramethoxysilane, tetraethoxysilane, tetrabutoxysilane and glycidoxymethyltrimethoxysilane.

6. A molded article according to claim 1, wherein the silicone hard coat layer contains fine particles of silica.

7. A molded article according to claim 1, wherein the silicone hard coat layer is dyed.

8. A molded article according to claim 1, wherein the silicone hard coat layer has haze value of 1.0% or less after having been subjected to Taber abrasion testing.

9. A molded article according to claim 1, wherein the silicone hard coat layer has a pencil hardness of 2H or higher.

10. A molded article according to claim 1, wherein the silicone hard coat layer has a thickness of 1–30 μm.

11. A molded article according to claim 1 which is a lens.

12. A molded article according to claim 11, wherein the modified surface layer of the substrate has been produced by energy beam irradiation treatment.

13. A molded article according to claim 12, wherein the energy beam irradiation treatment is a corona discharge, plasma, electron beam irradiation or ultraviolet ray irradiation treatment.

* * * * *